(12) United States Patent
Propheter-Hinckley et al.

(10) Patent No.: US 9,404,369 B2
(45) Date of Patent: Aug. 2, 2016

(54) AIRFOIL HAVING MINIMUM DISTANCE RIBS

(75) Inventors: Tracy A. Propheter-Hinckley, Manchester, CT (US); Benjamin T. Fisk, East Granby, CT (US); Steven Taffet, South Windsor, CT (US); Gregory M. Dolansky, Higganum, CT (US); Anita L. Tracy, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 1335 days.

(21) Appl. No.: 13/454,253

(22) Filed: Apr. 24, 2012

(65) Prior Publication Data

US 2013/0276460 A1    Oct. 24, 2013

(51) Int. Cl.
*F01D 5/14* (2006.01)
*B23P 15/02* (2006.01)
*F01D 5/18* (2006.01)

(52) U.S. Cl.
CPC ............... *F01D 5/147* (2013.01); *B23P 15/02* (2013.01); *F01D 5/187* (2013.01); *F05D 2260/22141* (2013.01); *Y10T 29/49336* (2015.01)

(58) Field of Classification Search
CPC ........................................................ F01D 5/147
USPC ........................................................ 416/233
See application file for complete search history.

(56) References Cited

U.S. PATENT DOCUMENTS

| | | | |
|---|---|---|---|
| 2,343,918 A | 5/1943 | McCoy | |
| 2,807,437 A * | 9/1957 | Roush | 416/233 |
| 3,017,159 A * | 1/1962 | Foster et al. | 416/90 R |
| 4,507,051 A * | 3/1985 | Lesgourgues et al. | 416/233 |
| 4,815,939 A | 3/1989 | Doble | |
| 5,038,014 A | 8/1991 | Pratt et al. | |
| 5,165,860 A | 11/1992 | Stoner et al. | |
| 5,246,340 A | 9/1993 | Winstanley | |
| 5,269,058 A * | 12/1993 | Wiggs et al. | 416/233 |
| 5,558,497 A | 9/1996 | Kraft et al. | |
| 5,837,960 A | 11/1998 | Lewis et al. | |
| 6,391,251 B1 | 5/2002 | Keicher et al. | |
| 6,669,447 B2 | 12/2003 | Beattie | |
| 7,029,232 B2 | 4/2006 | Tuffs et al. | |
| 7,112,044 B2 | 9/2006 | Whitehead et al. | |

(Continued)

OTHER PUBLICATIONS

International Search Report for PCT Application No. PCT/US2013/036510 completed Feb. 6, 2014.

(Continued)

*Primary Examiner* — Richard Edgar
(74) *Attorney, Agent, or Firm* — Carlson, Gaskey & Olds, P.C.

(57) ABSTRACT

An airfoil includes an airfoil body that defines a longitudinal axis. The airfoil body includes a leading edge and a trailing edge and a first side wall and a second side wall that is spaced apart from the first side wall to define a camber line there between. The first side wall and the second side wall join the leading edge and the trailing edge and at least partially define a cavity in the airfoil body. Multiple ribs extend longitudinally in the cavity and are laterally spaced apart from each other relative to the longitudinal axis. In at least one plane that is perpendicular to the longitudinal axis, each of the ribs connects the first side wall and the second side wall along respective minimum distance directions that are perpendicular to the camber line. At least two of the respective minimum distance directions are non-parallel.

17 Claims, 5 Drawing Sheets

(56) References Cited

U.S. PATENT DOCUMENTS

| | | | |
|---|---|---|---|
| 7,121,800 B2 | 10/2006 | Beattie | |
| 7,121,801 B2 | 10/2006 | Surace et al. | |
| 7,125,225 B2 | 10/2006 | Surace et al. | |
| 7,217,093 B2 | 5/2007 | Propheter et al. | |
| 7,270,517 B2 | 9/2007 | Garner | |
| 7,478,994 B2 | 1/2009 | Cunha et al. | |
| 7,857,588 B2 * | 12/2010 | Propheter-Hinckley | F01D 5/147 416/233 |
| 8,052,389 B2 * | 11/2011 | Kopmels | F01D 5/147 416/233 |
| 8,061,990 B1 | 11/2011 | Ryzinc | |
| 8,439,647 B2 * | 5/2013 | James | B21D 53/76 29/889.72 |
| 2005/0044708 A1 * | 3/2005 | Lundgren | B23K 26/24 29/889.72 |
| 2006/0292005 A1 | 12/2006 | Pietraszkiewicz | |
| 2009/0258168 A1 | 10/2009 | Barcock | |
| 2009/0304497 A1 | 12/2009 | Meier et al. | |
| 2010/0239412 A1 | 9/2010 | Draper | |
| 2011/0048664 A1 | 3/2011 | Kush et al. | |
| 2011/0311389 A1 * | 12/2011 | Ryan | B22F 3/1055 419/27 |

OTHER PUBLICATIONS

International Preliminary Report on Patentability for PCT Application No. PCT/US2013/036510, mailed Nov. 6, 2014.

* cited by examiner

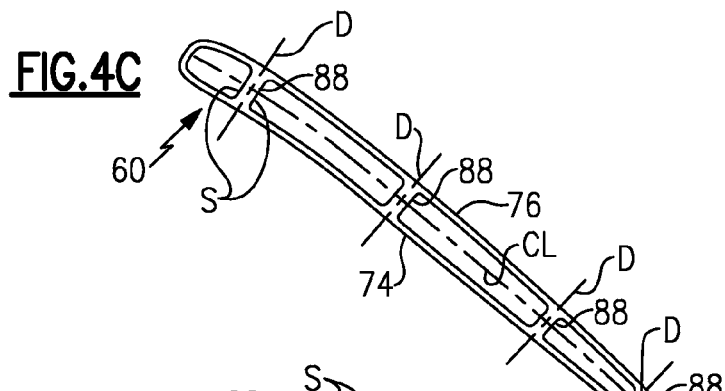
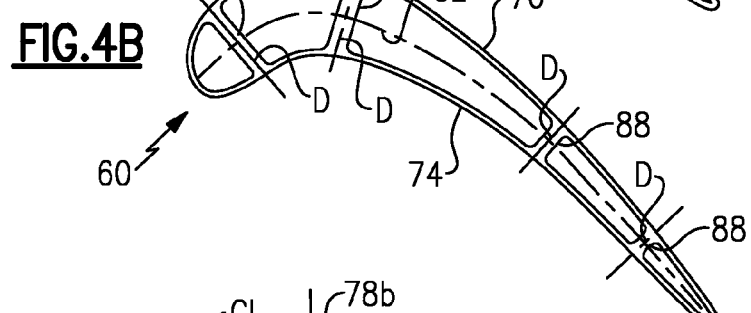
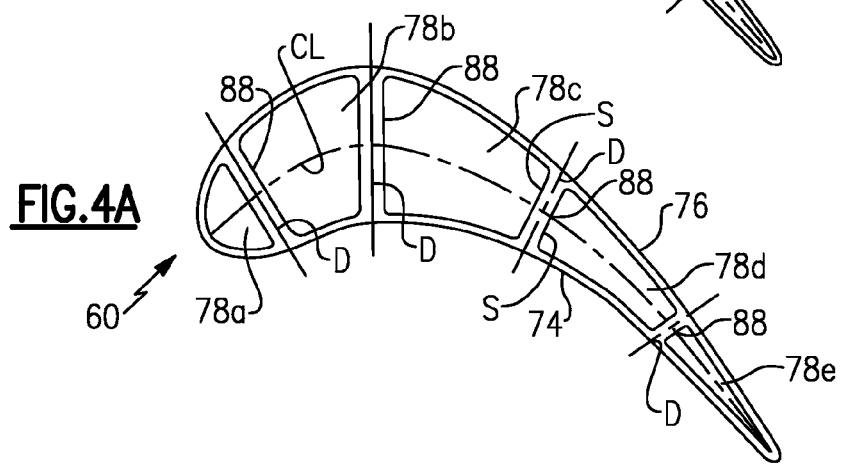
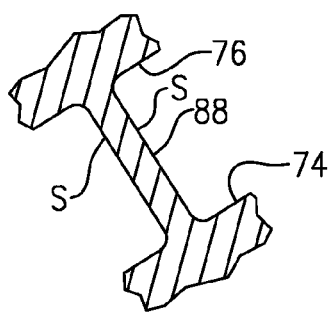
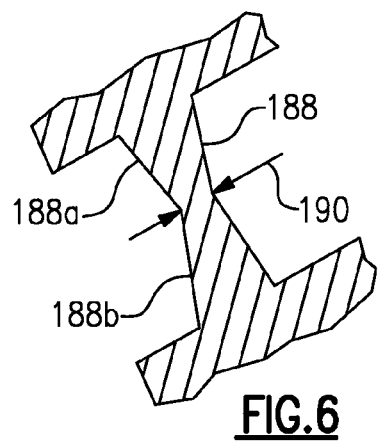

AIRFOIL HAVING MINIMUM DISTANCE RIBS

BACKGROUND

This disclosure relates to an airfoil, such as an airfoil for a gas turbine engine.

Turbine, fan and compressor airfoil structures are typically manufactured using die casting techniques. For example, the airfoil is cast within a mold that defines an exterior airfoil surface. A core structure may be used within the mold to form impingement holes, cooling passages, ribs or other structures in the airfoil. The die casting technique inherently limits the geometry, size, wall thickness and location of these structures. Thus, the design of a traditional airfoil is limited to structures that can be manufactured using the die casting technique, which in turn may limit the performance of the airfoil.

SUMMARY

An airfoil according to an exemplary aspect of the present disclosure includes an airfoil body defining a longitudinal axis. The airfoil body includes a leading edge and a trailing edge and a first side wall and a second side wall that is spaced apart from the first side wall to define a camber line there between. The first side wall and the second side wall join the leading edge and the trailing edge and at least partially define a cavity in the airfoil body. A plurality of ribs each extend longitudinally in the cavity and are laterally spaced apart from each other relative to the longitudinal axis. In at least one plane perpendicular to the longitudinal axis, each of the plurality of ribs connect the first side wall and the second side wall along respective minimum distance directions perpendicular to the camber line, and at least two of the respective minimum distance directions are non-parallel.

In a further non-limiting embodiment of the above example, the cavity has a longitudinal span from a base of the airfoil body to a tip end of the airfoil body, with the base being at 0% of the span and a tip end being at 100% of the span, the at least one plane including a first plane located at 0%-50% of the span and a second plane located at greater than 50% of the span.

In a further non-limiting embodiment of any of the foregoing examples, the cavity has a longitudinal span from a base of the airfoil body to a tip end of the airfoil body, with the base being at 0% of the span and a tip end being at 100% of the span. The one plane includes a first plane located at 0%-33% of the span and a second plane located at greater than 33% of the span.

A further non-limiting embodiment of any of the foregoing examples includes another plane at greater than 66 percent span wherein the respective minimum distance directions are parallel.

In a further non-limiting embodiment of any of the foregoing examples, at least one of the plurality of ribs includes a taper along the respective minimum distance direction.

In a further non-limiting embodiment of any of the foregoing examples, at least one of the plurality of ribs includes opposed tapers that meet at a minimum neck area.

In a further non-limiting embodiment of any of the foregoing examples, each of the plurality of ribs longitudinally divides the cavity into sections such that the respective sections bound opposed sides of the respective one of the plurality of ribs.

In a further non-limiting embodiment of any of the foregoing examples, the plurality of ribs includes four ribs of unequal length along the respective minimum distance directions.

In a further non-limiting embodiment of any of the foregoing examples, each of the plurality of ribs has a homogenous microstructure.

In a further non-limiting embodiment of any of the foregoing examples, all of the minimum distance directions are non-parallel.

A further non-limiting embodiment of any of the foregoing examples includes at least one cross-rib extending along one of the first side wall or the second side wall between adjacent ones of the plurality of ribs.

In a further non-limiting embodiment of any of the foregoing examples, at least one cross-rib is inclined with respect to the longitudinal axis.

In a further non-limiting embodiment of any of the foregoing examples, at least one rib is a corrugated rib.

A turbine engine according to an exemplary aspect of the present disclosure includes, optionally a fan, a compressor section, a combustor in fluid communication with the compressor section, and a turbine section in fluid communication with the combustor. The turbine section is coupled to drive the compressor section and the fan. At least one of the fan, the compressor section and the turbine section includes an airfoil having an airfoil body defining a longitudinal axis between a root and a tip end. The airfoil body includes a leading edge and a trailing edge and a first side wall and a second side wall that is spaced apart from the first side wall to define a camber line there between. The first side wall and the second side wall join the leading edge and the trailing edge and at least partially define a cavity in the airfoil body. A plurality of ribs each extend longitudinally in the cavity and are laterally spaced apart from each other relative to the longitudinal axis. In at least one plane perpendicular to the longitudinal axis, each of the plurality of ribs connect the first side wall and the second side wall along respective minimum distance directions perpendicular to the camber line, and the respective minimum distance directions are non-parallel.

In a further non-limiting embodiment of any of the foregoing examples, at least one of the plurality of ribs includes a taper along the respective minimum distance direction.

In a further non-limiting embodiment of any of the foregoing examples, all of the minimum distance directions are non-parallel.

In a further non-limiting embodiment of any of the foregoing examples, at least one rib is a corrugated rib.

A method for processing a blade according to an exemplary aspect of the present disclosure includes depositing multiple layers of a powdered metal onto one another, joining the layers to one another with reference to data relating to a particular cross-section of a blade, and producing the blade with an airfoil body defining a longitudinal axis between a root and a tip end. The airfoil body includes a leading edge and a trailing edge and a first side wall and a second side wall that is spaced apart from the first side wall to define a camber line there between. The first side wall and the second side wall join the leading edge and the trailing edge and at least partially define a cavity in the airfoil body. A plurality of ribs each extend longitudinally in the cavity and are laterally spaced apart from each other relative to the longitudinal axis. In at least one plane perpendicular to the longitudinal axis each of the plurality of ribs connects the first side wall and the second side wall along respective minimum distance directions perpendicular to the camber line, and the respective minimum distance directions are non-parallel.

An airfoil according to an exemplary aspect of the present disclosure includes an airfoil body defining a longitudinal axis. The airfoil body includes a leading edge and a trailing edge and a first side wall and a second side wall that is spaced apart from the first side wall. The first side wall and the second side wall join the leading edge and the trailing edge and at least partially define a cavity in the airfoil body. At least one corrugated rib extends in the cavity.

In a further non-limiting embodiment of any of the foregoing examples, the at least one corrugated rib includes a plurality of corrugated ribs that each extend longitudinally in the cavity and are laterally spaced apart from each other relative to the longitudinal axis. Each of the plurality of corrugated ribs connects to the first side wall and the second side wall and extends from a common node at one of the first side wall or the second side wall from which another of the plurality of corrugated ribs also extends from.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 4A shows a cross-section of the airfoil of FIG. 2 at a 0% percent span.

FIG. 4B shows a cross-section of the airfoil of FIG. 2 at greater than 50% percent span.

FIG. 4C shows a cross-section of the airfoil of FIG. 2 at 100% percent span.

FIG. 5 schematically shows a homogenous microstructure of a rib of an airfoil.

FIG. 6 shows a cross-section of modified rib shape.

DETAILED DESCRIPTION OF THE PREFERRED EMBODIMENT

Figure 1:
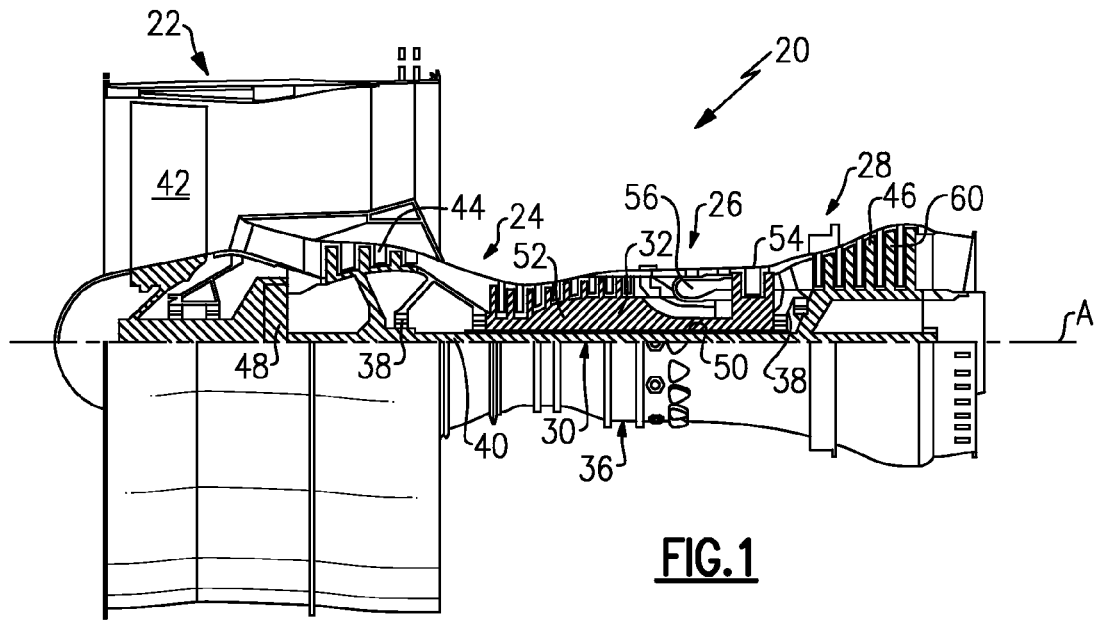
FIG. 1 shows an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 may be connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

Figure 2:
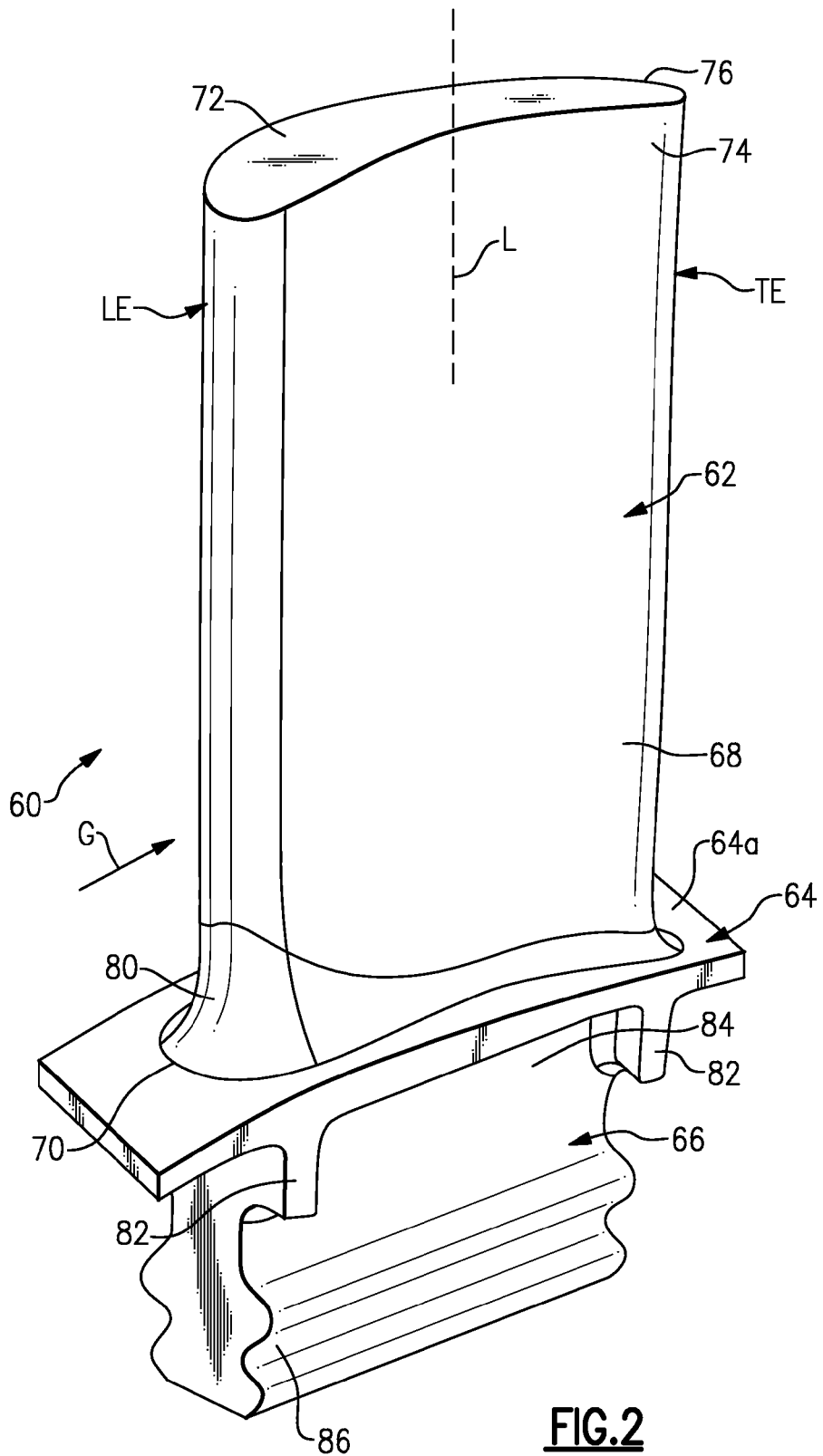
FIG. 2 shows a perspective view of an airfoil.

FIG. 2 illustrates an example airfoil 60. In this example, the airfoil 60 is a turbine blade of the turbine section 28. The airfoil 60 may be mounted on a turbine disk in a known manner with a plurality of like airfoils. Alternatively, it is to be understood that although the airfoil 60 is depicted as a turbine blade, the disclosure is not limited to turbine blades and the concepts disclosed herein are applicable to turbine vanes, compressor airfoils (blades or vanes) in the compressor section 24, fan airfoils in the fan section 22 or any other airfoil structures. Thus, some features that are particular to the illustrated turbine blade are to be considered optional.

The airfoil 60 includes an airfoil portion 62, a platform 64 and a root 66. The platform 64 and the root 66 are particular to the turbine blade and thus may differ in other airfoil structures or may be excluded in other airfoil structures.

The airfoil 60 includes a body 68 that defines a longitudinal axis L between a base 70 at the platform 64 and a tip end 72. The longitudinal axis L in this example is perpendicular to the engine central axis A. The body 68 includes a leading edge (LE) and a trailing edge (TE) and a first side wall 74 (pressure side) and a second side wall 76 (suction side) that is spaced apart from the first side wall 74. The first side wall 74 and the second side wall 76 join the leading edge (LE) and the trailing edge (TE) and at least partially define a cavity 78 (FIG. 3) in the body 68.

The airfoil portion 62 connects to the platform 64 at a fillet 80. The platform 64 connects to the root 66 at buttresses 82. The root 66 generally includes a neck 84 and a serration portion 86 for securing the airfoil 60 in a disk.

It should be understood that relative positional terms such as "forward," "aft," "upper," "lower," "above," "below," "circumferential," "radial" and the like are with reference to the normal operational attitude and engine central axis A, unless otherwise indicated. Furthermore, with reference to the engine 20, the tip end 72 of the airfoil 60 is commonly referred to as the outer diameter of the airfoil 60 and the root 66 is commonly referred to as the inner diameter of the airfoil 60. The platform 64 includes an upper surface 64a that bounds an inner diameter of a gas path, generally shown as G, over the airfoil portion 62. Some airfoils may also include a platform at the tip end 72 that bounds an outer diameter of the gas path G.

Figure 3:
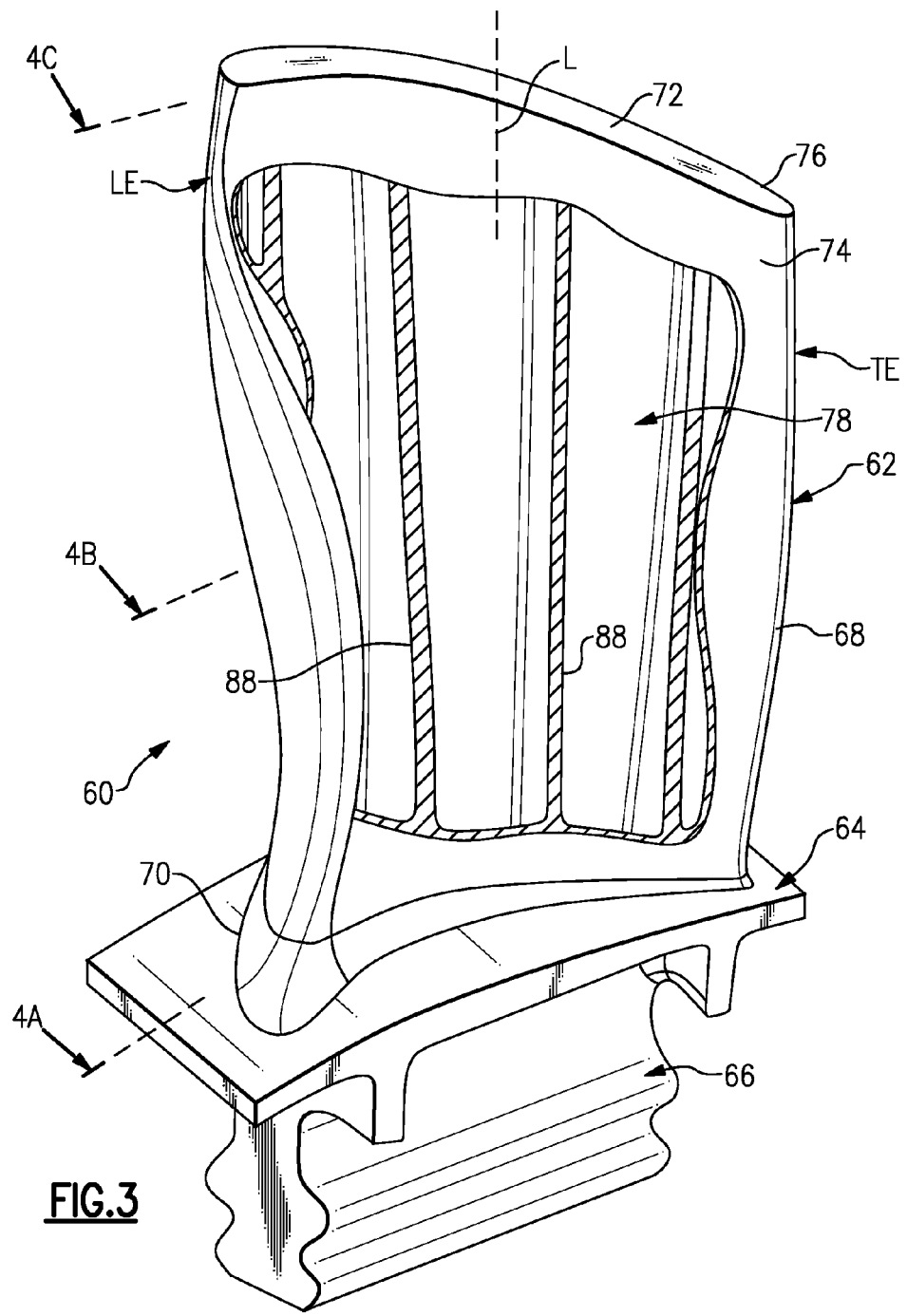
FIG. 3 shows the airfoil of FIG. 2 with a portion cutaway to reveal an internal cavity.

FIG. 3 shows the airfoil 60 with a portion of the first side wall 74 cutaway to reveal the cavity 78. The airfoil 60 includes a plurality of ribs 88 that each extend longitudinally in the cavity 78 and are laterally spaced apart from each other relative to the longitudinal axis L. In this example, each of the ribs 88 extends the full longitudinal length of the cavity 78 from the base 70 to the tip end 72. Each of the ribs 88 twists with regard to the longitudinal axis L as a function of longitudinal location within the cavity 78.

In general, the cavity 78 has a span, with the base 70 being at 0% of the span and the tip end 72 being at 100% of the span. FIG. 4A illustrates a cross-section of the airfoil portion 62 taken at 0% span. FIG. 4B illustrates a cross-section of the airfoil portion 62 taken at greater than 50% span. FIG. 4C illustrates a cross-section of the airfoil portion 62 taken at approximately 100% span. As shown for example in FIG. 4A, the first side wall 74 and the second side wall 76 are spaced apart from each other and define a camber line CL there between. The camber line CL is a curve that is equidistant between the side walls 74 and 76.

In at least one plane perpendicular to the longitudinal axis L, such as the cross-section shown in FIG. 4A or the cross-section shown in FIG. 4B, each of the plurality of ribs 88 connects the first side wall 74 and the second side wall 76 along respective minimum distance directions D that are perpendicular to the camber line CL. In the cross-section at 0% span shown in FIG. 4A and in the cross-section at greater than 50% span shown in FIG. 4B, at least two of the respective minimum distance directions D are non-parallel. Further, at 0% span in FIG. 4A, the four ribs 88 are of unequal length in the respective minimum distance directions D.

In the cross-section at greater than 50% span shown in FIG. 4B, the minimum distance directions D of two of the ribs 88 are approximately parallel. The other two minimum distance directions D are non-parallel to each other and are non-parallel to the first two minimum distance directions D.

In a further example, the geometry shown in the plane at the 0% span in FIG. 4A is representative of the orientation of the minimum distance directions D up through at least 33% span. Similarly, the geometry shown in the plane at greater than 50% span in FIG. 4B is representative of the orientation of the minimum distance directions up through nearly 100% span. At the cross-section at 100% span shown in FIG. 4C, the minimum distance directions D are parallel to each other. As used herein, the terms "parallel," "perpendicular" and other such angle-based geometric terms refer to the geometry within ±5° but may vary within this tolerance depending on airfoil shape and longitudinal location. The ribs 88 thus maintain the minimum distance direction D over the full span.

The ribs 88 divide the cavity 78 into sections 78a through 78e. The respective sections 78a through 78e bound opposed sides of the respective ribs 88. That is, each of the ribs 88 is bordered by two of the sections 78a through 78e.

Additionally, using the additive manufacturing process as described below, each of the ribs 88 can be made with a homogenous microstructure that is free of any distinct bonding interface therein. For example, the homogenous microstructure of one of the ribs 88 is shown generally in FIG. 5. That is, traditional methods of manufacturing airfoils that utilize die casting techniques and bonding of airfoil sections by welding or diffusion processes, create a distinct bonding interface or microstructural discontinuity within the microstructure of the ribs and require compromise of rib thickness to accommodate die casting. The presence of such a bonding interface limits the manufacturability of a given airfoil and may also limit rib geometry with regard to the minimum distance directions and rib thickness. Moreover, for airfoils that are not bonded and are instead fully cast, rib geometry is limited by the number of "pulls," or rib directions, such that if the number of different directions is greater than three, the casting becomes prohibitively complex and/or expensive. Thus, using traditional methods, it is difficult or impossible to produce the airfoil 60 with ribs 88 that maintain the minimum distance direction D over the full span. Additionally, each of the ribs 88 disclosed herein has opposed sides S that are parallel to each other at the given cross-sections. This parallel-side geometry is not feasible using die casting techniques, which limit rib geometry to accommodate die pull. The additive manufacturing process as described below is not limited by the number of "pulls" and thus the rib 88 geometries disclosed herein are obtainable.

FIG. 6 illustrates a cross-section of a modified rib 188 that is exemplary of ribs that can be used instead of the ribs 88. In this disclosure, like reference numerals designate like elements where appropriate and reference numerals with the addition of one-hundred or multiples thereof designate modified elements that are understood to incorporate the same features and benefits of the corresponding elements. In this example, the rib 188 tapers laterally with regard to the longitudinal axis L. Thus, the rib 188 includes a taper 188a where the rib 188 narrows in a lateral direction with regard to the longitudinal axis L. In this example, the rib 188 includes an additional taper 188b that opposes the other taper 188a. Thus, the tapers 188a and 188b taper in opposite directions and meet at a minimum neck area 190.

Figure 7:
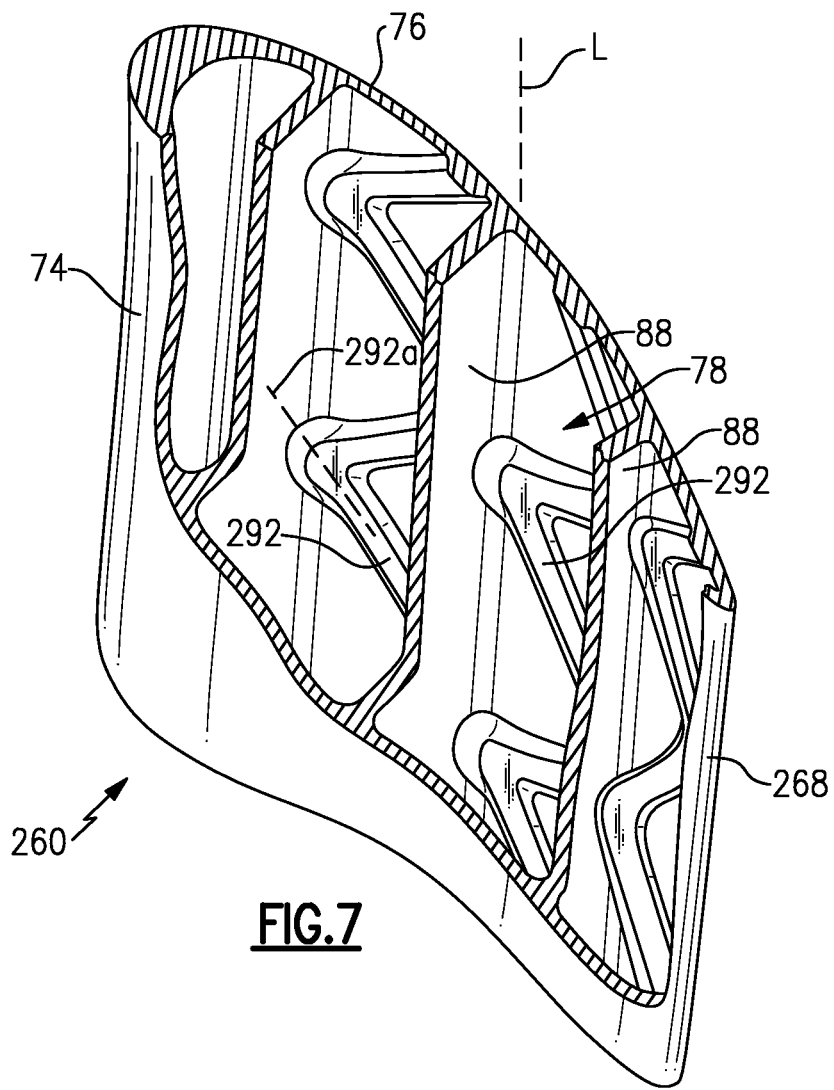
FIG. 7 shows a portion of another example airfoil partially cutaway to reveal an internal cavity having ribs and cross-ribs extending between the ribs.

FIG. 7 shows a portion of another airfoil 260 partially cutaway to reveal the cavity 78. The airfoil 260 is similar to the airfoil 60 shown in FIG. 3 but additionally includes one or more cross-ribs 292 that extend along one of the side walls 74 or 76 between adjacent ones of the ribs 88. In this example, each of the cross-ribs 292 extends along a respective central axis 292a that is inclined with respect to the longitudinal axis L. The airfoil 260 in this example includes a plurality of such cross-ribs 292 that may or may not intersect with each other. In this example, the support provided by the ribs 88 and the cross-ribs 292 allow the side walls 74 and 76 to have a through-thickness of 0.010 inches/254 micrometers to 0.060 inches/1524 micrometers, or specifically 0.015 inches/381 micrometers or less, over at least some fraction of the span, such as 75%-100% span. Without the support of the cross-ribs 292, the through-thickness may taper from about 0.01 to about 0.5, depending on the design of the engine 20.

Figure 8:
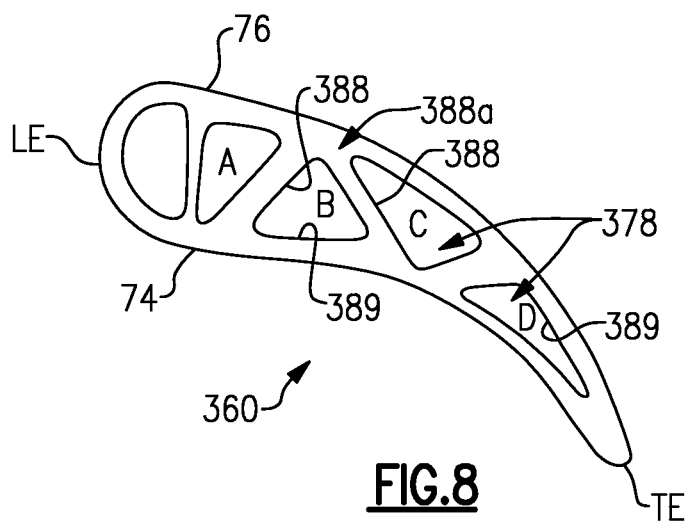
FIG. 8 illustrates an example of a corrugated rib.

FIG. 8 illustrates another example airfoil 360. In this example, the ribs 388 are arranged in a corrugated configuration. That is, the ribs 388 extend back and forth between the side walls 74 and 76 such that each rib 388 extends from one common node 388a from which one other rib 388 also extends from at one of the respective side walls 74 and 76. The ribs 388 thus define a plurality of cavities 378 in the airfoil 360.

From the trailing edge (TE), there are four cavities 378 that have triangular cross-section with rounded corners. The orientations between at least some of the cavities differ with respect to elongated sides 389 that extend along either the first side wall 74 or the second side wall 76. In this example, three of the four triangular cavities 378 have sides 389 extending along the second side wall 76 and one of the cavities has the side 389 extending along the first side wall 74. The sides 378 provide surface area for cooling the airfoil 360 during operation. The orientations of the cavities 378 with respect to the sides 389 can be selected for cooling management. For example, relatively cool air can first be fed through one of the cavities 378 with a side 389 extending along the second side wall 76. The cooling air can then be fed through another of the cavities 378 with the side 389 extending along the first side wall 74, or vice versa, depending on cooling requirements. In a further example, the cooling air is fed serially through the cavities 378 indicated A-D.

Figure 9:
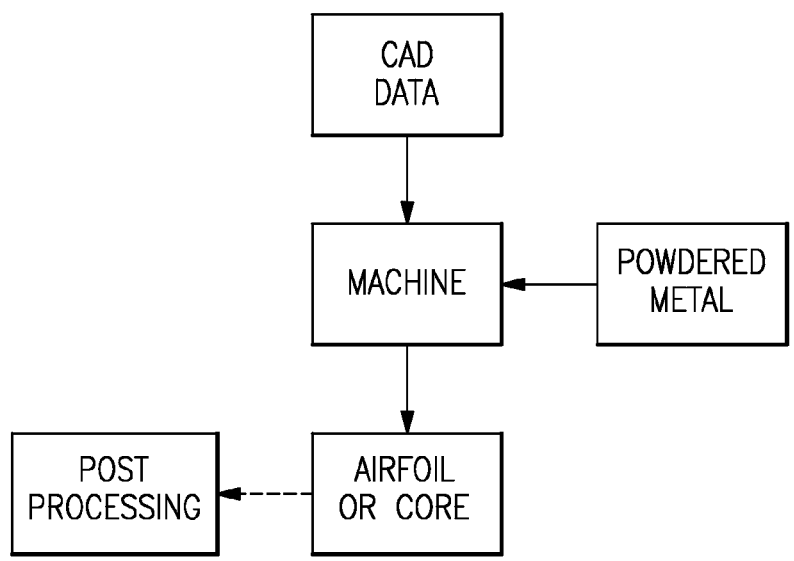
FIG. 9 shows a method of processing an airfoil using an additive manufacturing process.

The geometries disclosed herein may be difficult to form using conventional casting technologies. Thus, a method of processing an airfoil having the features disclosed herein includes an additive manufacturing process, as schematically illustrated in FIG. 9. Powdered metal suitable for aerospace airfoil applications is fed to a machine, which may provide a vacuum, for example. The machine deposits multiple layers of powdered metal onto one another. The layers are selectively joined to one another with reference to Computer-Aided Design data to form solid structures that relate to a particular cross-section of the airfoil. In one example, the powdered metal is selectively melted using a direct metal laser sintering process or an electron-beam melting process. Other layers or portions of layers corresponding to negative features, such as cavities or openings, are not joined and thus remain as a powdered metal. The unjoined powder metal may later be removed using blown air, for example. With the layers built upon one another and joined to one another cross-section by cross-section, an airfoil or portion thereof, such as for a repair, with any or all of the above-described geometries, may be produced. The airfoil may be post-processed to provide desired structural characteristics. For example, the airfoil may be heated to reconfigure the joined layers into a single crystalline structure.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An airfoil comprising:
   an airfoil body defining a longitudinal axis, the airfoil body including a leading edge and a trailing edge and a first side wall and a second side wall that is spaced apart from the first side wall to define a camber line there between, the first side wall and the second side wall joining the leading edge and the trailing edge and at least partially defining a cavity in the airfoil body; and
   four ribs each extending longitudinally in the cavity and being laterally spaced apart from each other relative to the longitudinal axis,
   in at least one plane perpendicular to the longitudinal axis, each of the four ribs connecting the first side wall and the second side wall along respective minimum distance directions perpendicular to the camber line, at least two of the respective minimum distance directions are non-parallel, and each of the four ribs has a homogenous microstructure with regard to microstructural discontinuities, wherein the cavity has a longitudinal span from a base of the airfoil body to a tip end of the airfoil body, with the base being at 0% of the span and a tip end being at 100% of the span, the at least one plane including a first plane located at 0%-33% of the span and a second plane located at greater than 33% of the span; and
   another plane at greater than 66 percent span wherein the respective minimum distance directions are parallel.

2. The airfoil as recited in claim 1, wherein at least one of the four ribs includes a taper along the respective minimum distance direction.

3. The airfoil as recited in claim 1, wherein at least one of the four ribs includes opposed tapers that meet at a minimum neck area.

4. The airfoil as recited in claim 1, wherein each of the four ribs longitudinally divides the cavity into sections such that the respective sections bound opposed sides of the respective one of the plurality of ribs.

5. The airfoil as recited in claim 1, wherein the four ribs have unequal lengths along the respective minimum distance directions.

6. The airfoil as recited in claim 1, wherein, in the at least one plane, all of the minimum distance directions are non-parallel.

7. The airfoil as recited in claim 1, further including at least one cross-rib extending along one of the first side wall or the second side wall between adjacent ones of the plurality of ribs.

8. The airfoil as recited in claim 7, wherein the at least one cross-rib is inclined with respect to the longitudinal axis.

9. The airfoil as recited in claim 1, wherein each of the four ribs extends a full longitudinal length of the cavity.

10. The airfoil as recited in claim 9, wherein, with respect to the number of ribs that extend the full length of the cavity, the cavity consists of the four ribs.

11. The airfoil as recited in claim 1, wherein at a 0% span of the cavity the four ribs have unequal lengths in the respective minimum distance directions.

12. An airfoil comprising:
    an airfoil body defining a longitudinal axis, the airfoil body including a leading edge and a trailing edge and a first side wall and a second side wall that is spaced apart from the first side wall to define a camber line there between, the first side wall and the second side wall joining the leading edge and the trailing edge and at least partially defining a cavity in the airfoil body; and
    four ribs each extending longitudinally in the cavity and being laterally spaced apart from each other relative to the longitudinal axis,
    in at least one plane perpendicular to the longitudinal axis, each of the four ribs connecting the first side wall and the second side wall along respective minimum distance directions perpendicular to the camber line, at least two of the respective minimum distance directions are non-parallel, and each of the four ribs has a homogenous microstructure with regard to microstructural discontinuities,
    wherein at a 0% span of the cavity the four ribs have unequal lengths in the respective minimum distance directions, and at greater than a 50% span of the cavity the minimum distance directions of two of the four ribs are non-parallel and the minimum distance directions of the other two of the four ribs are approximately parallel.

13. The airfoil as recited in claim 12, wherein at a 100% span of the cavity the minimum distance directions of the four ribs are approximately parallel.

14. A turbine engine comprising:
    a fan;
    a compressor section;
    a combustor in fluid communication with the compressor section; and a turbine section in fluid communication with the combustor, the turbine section being coupled to drive the compressor section and the fan, and at least one of the fan, the compressor section and the turbine section including an airfoil having an airfoil body defining a longitudinal axis between a root and a tip end, the airfoil body including a leading edge and a trailing edge and a first side wall and a second side wall that is spaced apart from the first side wall to define a camber line there between, the first side wall and the second side wall joining the leading edge and the trailing edge and at least partially defining a cavity in the airfoil body, four ribs each extending longitudinally in the cavity and being laterally spaced apart from each other relative to the longitudinal axis, and in at least one plane perpendicular to the longitudinal axis, each of the four ribs connecting the first side wall and the second side wall along respective minimum distance directions perpendicular to the camber line, at least two of the minimum distance directions are non-parallel, and each of the four ribs has a homogenous microstructure with regard to microstructural discontinuities, wherein the cavity has a longitudinal span from a base of the airfoil body to a tip end of the airfoil body, with the base being at 0% of the span and a tip end being at 100% of the span, the at least one plane including a first plane located at 0%-33% of the span and a second plane located at greater than 33% of the span, and another plane at greater than 66 percent span wherein the respective minimum distance directions are parallel.

15. The turbine engine as recited in claim 14, wherein at least one of the four ribs includes a taper along the respective minimum distance direction.

16. The turbine engine as recited in claim 14, wherein, in the at least one plane, all of the minimum distance directions are non-parallel.

17. A method for processing a blade, the method comprising:

depositing multiple layers of a powdered metal onto one another;

joining the layers to one another with reference to data relating to a particular cross-section of a blade; and producing the blade with an airfoil body defining a longitudinal axis between a root and a tip end, the airfoil body including a leading edge and a trailing edge and a first side wall and a second side wall that is spaced apart from the first side wall to define a camber line there between, the first side wall and the second side wall joining the leading edge and the trailing edge and at least partially defining a cavity in the airfoil body, four ribs each extending longitudinally in the cavity and laterally spaced apart from each other relative to the longitudinal axis, and in at least one plane perpendicular to the longitudinal axis, each of the four ribs connecting the first side wall and the second side wall along respective minimum distance directions perpendicular to the camber line, at least two of the minimum distance directions are non-parallel, and each of the four ribs has a homogenous microstructure with regard to microstructural discontinuities, wherein the cavity has a longitudinal span from a base of the airfoil body to a tip end of the airfoil body, with the base being at 0% of the span and a tip end being at 100% of the span, the at least one plane including a first plane located at 0%-33% of the span and a second plane located at greater than 33% of the span, and another plane at greater than 66 percent span wherein the respective minimum distance directions are parallel.

\* \* \* \* \*